United States Patent [19]
Katsumori et al.

[11] 3,874,486
[45] Apr. 1, 1975

[54] SHOCK ABSORBER AND SUSPENSION STRUT

[75] Inventors: Teiji Katsumori; Yoshisuke Ohsaka, both of Yokohama; Tetuo Kato, Kawasaki, all of Japan

[73] Assignee: Tokico Ltd., Kawasaki, Japan

[22] Filed: Oct. 4, 1973

[21] Appl. No.: 403,353

Related U.S. Application Data

[63] Continuation of Ser. No. 213,379, Dec. 29, 1971, abandoned.

[30] Foreign Application Priority Data
Dec. 29, 1970 Japan.............................. 45-126611
Apr. 19, 1971 Japan................................ 46-24739

[52] U.S. Cl.................. 188/314, 188/269, 188/282
[51] Int. Cl............................................... F16d 9/06
[58] Field of Search .......... 188/317, 282, 314, 269, 188/286

[56] References Cited
UNITED STATES PATENTS
2,183,003  12/1939  Becker................................ 188/314

*Primary Examiner*—George E. A. Halvosa
*Attorney, Agent, or Firm*—Sughrue, Rothwell, Mion, Zinn & Macpeak

[57] ABSTRACT

This invention relates to a vibration damping mechanism adapted for use as shock absorber and suspension strut advantageously used on automotive and railroad vehicles.

The mechanism comprises a cylinder mechanically connected with an axle-mounting device, with a piston slidably mounted in the cylinder. The piston divides the interior space of the cylinder into first and second chambers. The piston is connected rigidly with a piston rod, susbantially part of which is formed into a hollow one. The interior space of the hollow piston rod includes an upper high pressure gas chamber and a lower liquid space which is fluidically connected with said second chamber.

The main improvement resides in the provision of a fluid flow-limiting passage adapted for returning occasionally accumulated gas from the chamber back into the said gas chamber.

1 Claim, 12 Drawing Figures

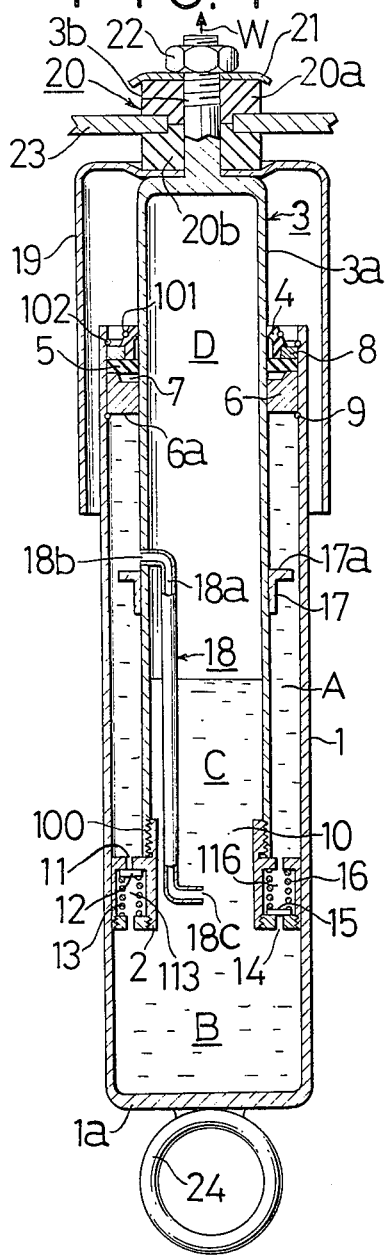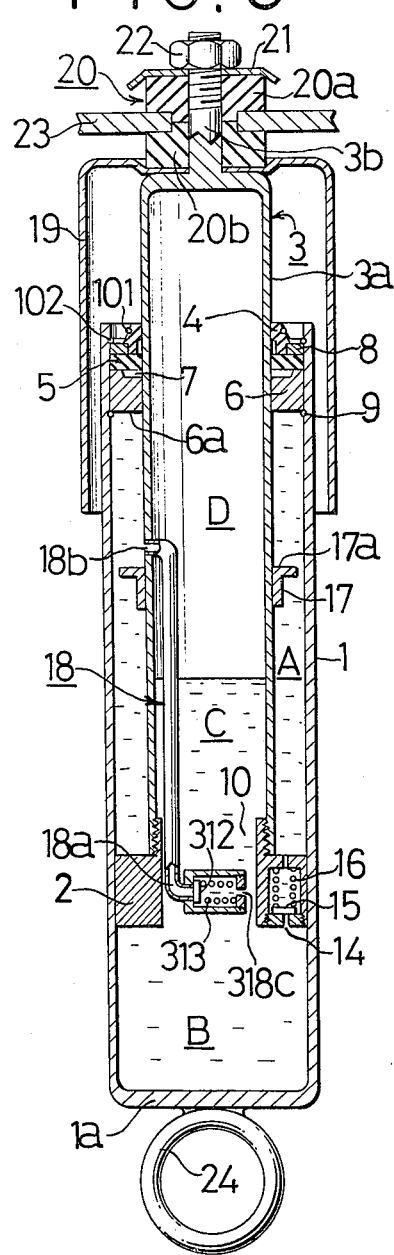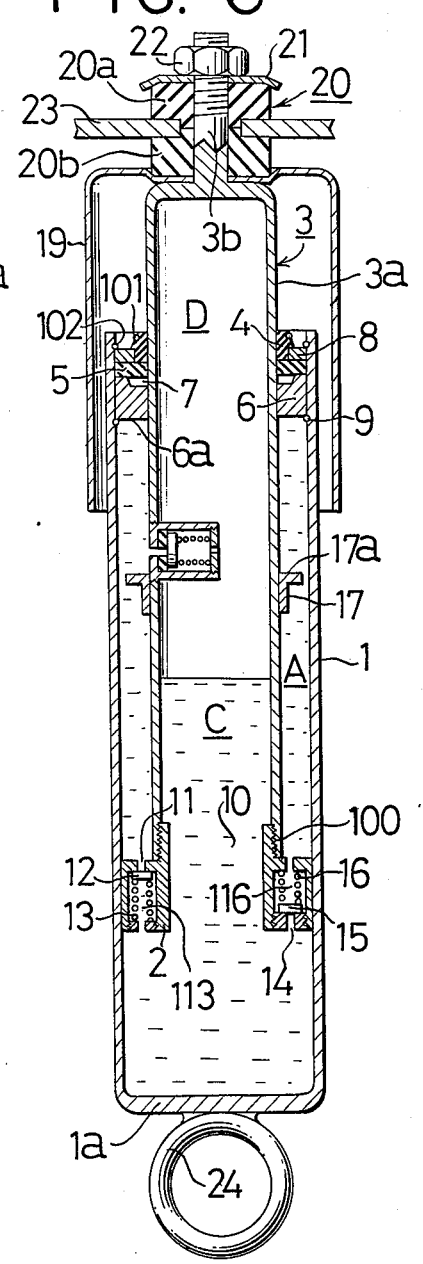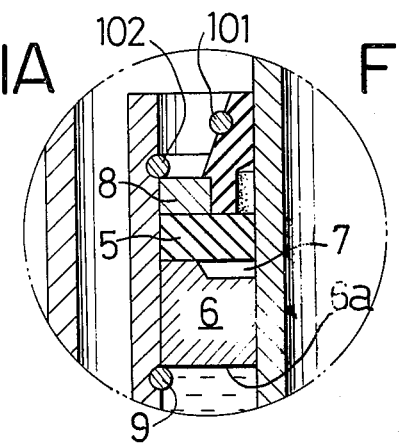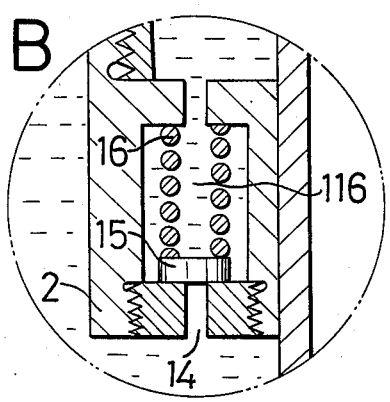

FIG. 7
FIG. 8
FIG. 1C
FIG. 6A
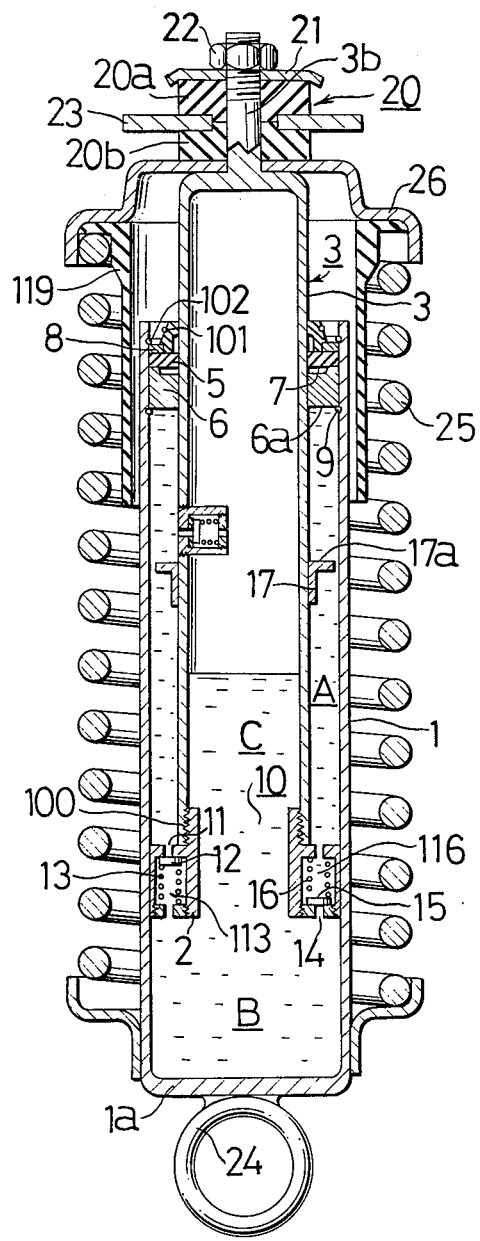
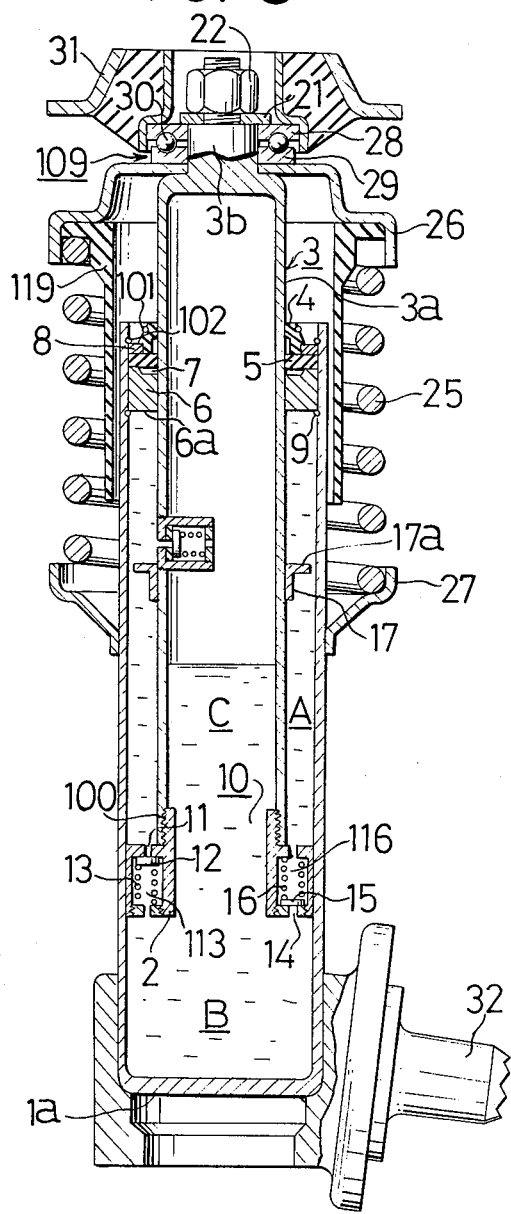
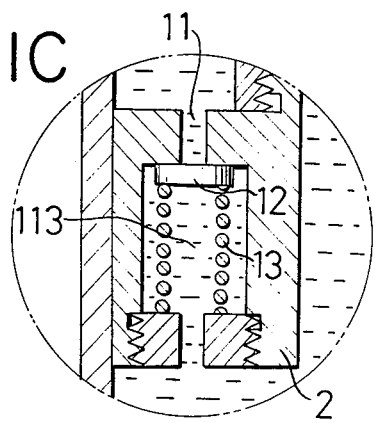
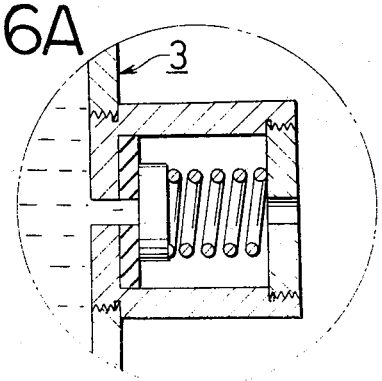

SHOCK ABSORBER AND SUSPENSION STRUT

This application is a continuation of application Ser. No. 213,379, filed Dec. 29, 1971, now abandoned.

This invention relates to a vibration damping mechanism adapted for use as shock absorber and suspension strut advantageously used on automotive and railway vehicles.

The main object is to provide a vibration damper mechanism of the above kind and operable in the joint hydraulic and pneumatic mode wherein a high pressure gas is sealed in the mechanism and special caution is paid for the prevention of leakage of the sealed-in gas or air from inside to outside of the mechanism.

A further object is to provide an efficient vibration damper mechanism having a stabilized damping performance and an efficient heat dissipation performance.

These and further objects, features and advantages will become more apparent when read the following detailed description of the invention by reference of the accompanying drawings.

FIG. 1 is an axial section of a first or main embodiment of the invention.

FIGS. 1A, 1B and 1C are enlarged parts of the first embodiment shown in FIG. 1.

FIGS. 3, 4 and 5 represent similar view to FIG. 1, showing, however, respective modification from the first embodiment.

FIGS. 6, 7 and 8 are similar views to FIG. 1, showing further several modifications.

FIG. 6A is a part of FIG. 6 expressed on a large scale.

Figure 2:
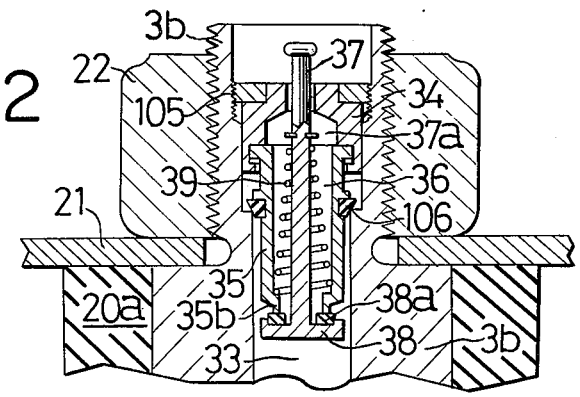
FIG. 2 is an enlarged sectional and detail view of the uppermost part of the first embodiment, when, however, it is fitted with a gas or oil introducing or discharging valve system.

Referring now to the accompanying drawings, several preferred embodiments of the invention will be described hereinafter in detail.

In FIG. 1, numeral 1 represents a stationary upright cylinder containing oil or the like incompressible liquid within the interior space thereof, as will be more specifically described.

A piston 2 is sealingly and slidably received in the cylinder 1 and defines the interior space thereof into an upper pressure chanber A and a lower pressure chamber B, the cylinder being open at its top end and closed at its bottom end 1a.

A piston rod 3, only partially shown, has a hollow part 3a at its lower end which extends into the interior space of cylinder 1 and is fixedly attached at its lowermost extremity to the piston 2 by screw connection at 100.

A dust seal 4 is made from a resilient material, such as soft rubber plastics or the like, attached with a metal ring 8, and inserted at the top end of cylinder 1 between the latter and the hollow rod part 3a and kept in position by its own elasticity, for preventing invasion of foreign matters from outside into the interior space of the cylinder.

Numeral 5 represents a sealing packing made from soft rubber or the like material and kept sealingly in position directly below the dust seal 4 and between the cylinder 1 and the hollow rod part 3a, for preventing leakage of the oil from the interior space of the cylinder 1 towards outside. Directly below the sealing packing 5, there is provided a guide ring 6 positioned between the cylinder 1 and the hollow rod part 3a for effectively guiding the sliding movement of the rod 3.

For positioning the dust seal 4, there are provide pressure spring clips 101 and 102, as most clearly be seen from FIG. 1A. For retaining the guide ring 6, there is provided a spring clip 9, as most clearly seen therefrom.

Guide ring 6 is recessed to form a ring space 7 which is kept in fluid communication through a fine gap provided between the hollow rod part 3a and the guide ring 6 with the pressure chamber A defined by the membes 1, 2, 3 and 6 and filled with oil. It will thus be seen from the foregoing that the assembly consisting substantially of the members 4, 5, 6 and 8 provided an effective sealing and guide means at the top open end of the cylinder 1 and for the slidable hollow rod part 3a.

Piston 2 is largely bored in its centrally and axially with a passage opening 10, the upper end of which opens to the interior space of the hollow rod part 3a, while the lower end of said opening 10 opens to the lower oil chamber B. The interior space of the hollow rod is divided into a lower oil chamber C and an upper gas chamber D, as seen. The gas pressure contained in the chamber D may attain 30 – 35 kgs/sq.cm as an example.

The piston 2 is formed with a plurality of concentrically arranged axial oil passage openings 11 for allowing, when necessary, fluid communication between chambers B and A. Each of these passage openings 11, only one thereof is seen, is enlarged at its intermidiate portion between the both extremities thereof, so as to provide a valve chamber 113 in which a check valve 12 and a valve spring 13 are provided for allowing only unidirectional oil flow from the upper oil chamber A to the lower B. A plurality similar passage openings 14, only one thereof being seen, are formed axially through the piston 2, a valve chamber 116 being formed in the similar way between the upper and lower extremities of each of these passage openings 14. The valve chamber 116 contains a check valve 15 and a valve spring 16 for allowing unidirectional oil flow reversedly from the lower "B" to the upper oil chamber A.

The valve assembly comprising passage opening 11, check valve 12 and its spring 13 acts as first damping force-generating means during upward movement of piston 2 in the case of the telescopic expansion stroke of the whole damper assembly by providing substantial resistant or damping force to the oil flow from chamber A to chamber B. In the similar way, the valve assembly comprising passage opening 14, check valve 15 and its spring 16 acts as second damping force-generating means during downward movement of piston 2 in the case of the telescopic collapsing stroke of the whole damper assembly by providing substantial resistant or damping force to the oil flow in the reversed sense.

Although in the foregoing, specifically selected check valve type damping means have been shown and described, a corresponding number of flow reducing orifice means can be replaced therefor. As a further alternative, check valve means or the like flow reducing or checking means can be provided between the chambers A and C in place of those provided between the chambers A and B. As a still further alternative, the central passage 10 is closed and said kind of damping means may be provided through the closure, not shown, provided for that purpose.

At an intermediate position between the upper and lower ends of the hollow rod part 3a and on the outer peripheral surface thereof, there is provided a circular flange piece 17 fixedly mounted or the like conventional fixing measure and serving as a stop means when the rod 3 has arrived at its allowable uppermost expanded position and by bringing its upper surface 17a into abutment with the lower surface 6a of the guide ring 6.

Numeral 18 represents a communication tube contained in the common interior space of the hollow rod part 3a and the piston 2. The upper end extremity 18b of this tube 18 passes fixedly through the wall of the hollow rod at a slight higher level than the ring flange 17 and open to the ring-shaped pressure chamber A, while the lower end extremity 18b of said tube 18 opens at the inside space of the central passage 10. Thus, it will be seen the spacial position of the upper tube opening 18b varies with movement of the piston rod assembly 2; 3. Therefore, it will be further seen that said upper opening 18b may be brought into fluid communication with the uppermost part of the chamber A or even with the ring space 7 communicating therewith when the piston-rod assembly occupies its upper stroke end.

The lowermost opening 18c of said communication tube 18 may be modified, so far as its bore 18a connects with the central liquid chamber C or with the lower oil chamber B.

Numeral 19 represents an elongated cup-shaped cover which is fixedly attached to the closed upper end of the hollow rod part 3a and a cushioning member 20 is attached fixedly to the reduced and rigid extension 3b of the said part 3a. It will thus be seen that the rod 3 consists substantially of the both parts 3a and 3b. For fixingly attaching the cushioning member 20, consisting of two mating parts 20a and 20b as shown, there are provided a washer 21 and nut 22 which has been threaded tightly on the upper male threaded part of the rod extension 3b. Numeral 23 represents a part of the vehicle chassis and resiliently squeezed by and between the cushioning members 20a and 20b for mounting the piston-rod assembly.

The bottom closed end 1a of the cylinder 1 is attached fixedly with an attaching member 24, preferably made into a ring as shown, by welding or the like conventional fixing means. This attaching member 24 is attached fixedly to a axle-mounting means, not shown.

The whole assembly so far shown and described may be utilized as a shock absorber or vehicle suspension, as the case may be.

Next, the operation of the shock absorber or vehicle suspension having the foregoing structure will be described hereinbelow in detail.

When the vehicle is in its stationary position, the piston 2 is positioned at a neutral or an intermediate position within the interior of the cylinder 1. In this way, the whole mechanism will support the allocated weight of the chassis. This bearing load can be naturally reduced, when the mechanism is provided with a mechanical or pneumatic suspension spring, not shown, attached thereto.

By the gas pressure exerted by the contained high pressure gas or air in the central chamber D, the piston-rod assembly 2; 3 will be urged to move upwardly with a certain upwardly directing force, as shown in a simplified and schematic way by an arrow W for supporting the allocated chassis weight.

Now, it is assumed that the piston 2 is positioned at its neutral position and the gas pressure in the gas chamber D at this stage be at P, the said expandingly urging force W may be calculated by the following formulae 1 and 2:

$$P = \frac{V_0}{V_0 - \frac{\pi}{4} d^2 S} P_0 \quad (1)$$

$$W = \frac{\pi}{4} d^2 P \quad (2)$$

where, $V_0$ stands for the gas volume contained in chamber D when the piston has been extended to a maximum stroke position; $P_0$ stands for the corresponding gas pressure; $S$ stands for the maximum deformation distance as measured from said maximum stroke position to the neutral one; $d$ stands for the outer diameter of the hollow piston rod part 3a. As was above referred to, the allocated chassis load is born by this expandingly urging force W.

As commonly known, it is desired to maintain the height of the chassis from the ground surface at a constant level as possible, irrespective of increase or decrease in the chassis side load. With use of the mechanism according to this invention, the desired constant height of the chassis can be substantially satisfied by varying said expandingly urging force W. This feature will be described more in detail hereinbelow.

It is further assumed that when the vehicle is held in its stationary state and the chassis side load or weight is increased by an increment $W_1$ and the gas pressure in chamber D is increased by $P_1$, then:

$$P_1 = \frac{W_1}{\frac{\pi}{4} d^2} \quad (3)$$

Under these conditions, the chassis side weight increment $W_1$ is supported by the increased pressure increment $P_1$, thus the chassis height with the vehicle held at its stationary position will not be subject to alteration.

On the contrary, when the chassis side weight is reduced by $W_2$ with the vehicle kept in its stationary position, and the gas pressure prevailing in the chamber D is reduced by $P_2$ whcih is calculated by the following formula:

$$P_2 = \frac{W_2}{\frac{\pi}{4} d^2} \quad (4)$$

the chassis height of the vehicle held stationary will be subject no alteration.

In FIG. 2, an embodiment of an apparatus adapted for adjustment of the chassis height by modification of the gas pressure in the chamber D is shown only schematically.

In FIG. 2, numeral 33 represents a gas pressure adjusting duct which has been bored axially and centrally through the rod extension 3b and 34 and 35 represent two mutually and mechanically coupled valve body elements to form a body assembly which is bored axially with a fluid passage 36 adapted for introducing gas or oil into the said chamber D through said duct 33. The valve body assembly 34; 35 is firmly held in position by the threaded engagement at 105. The duct 33 is sealed off towards outside by the provision of a sealing packing 35a which is held in position, as shown, on the outer periphery of the lower hollow valve body element 35 and against a shoulder 106 formed on the axial bore wall of rod extension 3b. Numeral 37 represents a valve stem which is fixedly attached at its bottom end with a valve disc 38 carry fixedly a resilient sealing member 38a, the latter normally sealing off the valve seat 35b formed at the lower end of the lower valve body element 35.

The valve stem 37 can move axially of the fluid passage 36 and the upper end of said stem protrudes out of the interior of upper valve body element 34. A compression spring 39 is provided and tensioned between lower valve body element 35 and a stop member 37a attached to said stem 37 so that the valve disc 38, together with sealing member 38a, is held resiliently and normally at the valve closing position as shown, so as to shut off the passage 36 thereat.

A pressure hose fitting of conventional design and being provided with a manually operable pusher is attached sealingly to the upper threaded end of the rod extension 3b. By manually operating pusher so as to collide against the enlarged head of valve stem 37 ehich is thus depressed downwards for introducing high pressure gas flow, from a certain gas or air reservoir at a pressure of about 40 kg/sq.cm by way of example. By this operation, valve disc 38, together with sealing member 38a, will recede downward from contact with valve seat 35b so that the introduced high pressure gas flow will be led through the duct 33 into the gas chamber D for increasing the pressure prevailing therein.

Or alternatively, when it is desired to reduce the gas pressure prevailing in the chamber D, the gas or air reservoir, not shown, is detached from the other end of said supply hose and then the pusher, not shown, is manipulated to open again the valve at 38; 38a relative to the seat 35b. The gas flow will thus be reversed in its direction and therefore, desired quantity of pressure gas may be discharged from the gas chamber D.

When occasion may demands, oil may be introduced to the oil chamber C via the gas chamber D substantially by flowing after the above procedure. When discharging oil from the interior of the shock absorber to a desired degree, the absorber or even positioned at an inverted position.

By adopting any one of the above procedure, the W-S characteristic curve of the shock absorber can be modified as desired. Naturally, S denotes the strain.

When the vehicle is running and the chassis oscillates up and down, the shock absorber will be subjected once to the expanding vibrating influence. In this case, the piston 2 will elevates within the cylinder 1 so that oil in the chamber A is further pressurized and discharged therefrom through the bore 18a of communication tube 18 into the passage bore 10. The increased oil pressure in the chamber A will open the check valves 12 against the action of respective valve springs 13 and escape through the reduced flow passages 11 thus opened, into the pressure oil chamber B. The thus generated flow resistance force will act as vibration damping force so that the vibration energy of the vehicle is thus damped. In this case, the oil quantity corresponding to the receded or displaced volume caused by the receding movement of the piston rod 3 from within the interior space of the cylinder 1 will be supplemented by oil flowing from the chamber C through passage bore 10 into the chamber B. In this case, the effective volume of the chamber D will be subject to a corresponding expansion and the gas pressure prevailing therein will be lowered correspondingly.

On the contrary, when the shock absorber will be subject to a collapsing effect by the reversed vibrating movement of the vehicle, piston 2 will descend in the cylinder 1 and the oil prevailing in the chamber B will be further pressurized and try to escape partially therefrom through the bore 18a of the communication tube 18 into the chamber A, thereby the flow passages 14 being opened by moving the respective check valves 15 in their opening position against the action of the respective valve springs 16. This flow restricting action or flow resistance will act as the damping action so that the vibration energy of the vehicle is partially absorbed and thus damped. The oil quantity corresponding to the volume reduced in the cylinder 1 caused by the invading movement of piston rod 3 into the interior space of the cylinder 1 is discharged from the chamber B through passage bore 10 into the chamber C, thus the effective volume of gas chamber D being correspondingly reduced and the gas pressure prevailing therein will be elevated correspondingly.

The communicating tube 18 will act normally as a kind of damping force-generating means for allowing a flow-restricting passage of oil responsive to the reciprocating movement of the piston-rod assembly, and further provide the following salient advantage.

More specifically, with the aforementioned vibration-damping operation of the above mentioned shockabsorber and when part of the pressurized gas in the chamber D invades into the interior of cylinder 1, the entrained high pressure gaseous medium may accumulate at the uppermost part of the chamber A.

With increase of the gas accumulation thereat, it will be conveyed through fine gaps existing between rod 3 and rod guide member 6 into the ring space 7 and is accumulated therein. When considered this effect, the sealing packings 5 must have the gas leakage-preventing function, in place of the similar action relative to the pressurized oil. As is commonly known, a seal against a gaseous medium is highly difficult relative to that against oil and it has been frequently concluded among those skilled in the art that an effective seal against a high gas pressure such as 30 – 40 kgs/sq.cm or so is in practice substantially impossible. The provision of the said communication tube 18 will serve for returningly conveying the accumulated high pressure gaseous medium at the uppermost part of the chamber A or within the ring space 7 into the high pressure gas chamber D formed within the interior space of the hollow rod part 3a of said piston rod 3. In this way, any escapement or leakage of the gaseous medium from the absorber system towards outside and through the sealing means provided at the top and open end of the cylinder can be perfectly and amazingly prevented according to this invention which means a remarkable progress in the art.

Since the communication tube per se has an effective vibration damping means by establishing a restricted fluid communication between the oil chamber A and the oil chamber C or B, oil passages 11; 14, valve 12; 15 and springs 13; 16 and the like which establish and constitute damping force-generating means can be dispensed with when occasion may so desire to a rather surprising manner. This means also a further progress in the shock-absorber art.

Figure 3:
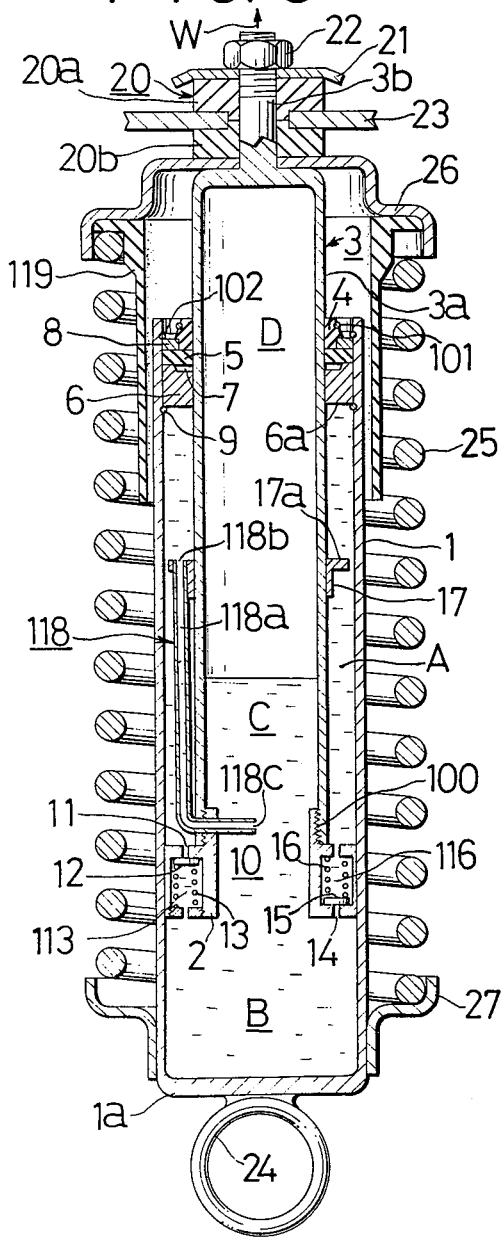

In the modified embodiment shown in FIG. 3 from that shown in FIG. 1, the difference resides in the arrangement of the communication tube, now denoted with 118. Other constituents have respective same or similar design and function so that they have been denoted with respective same reference numerals and symbols to those employed in the foregoing first embodiment.

In this modification, the communication tube 118 is arranged to reside within the chamber A and its upper end 118b passes through the material of the ring flange 17 acting as stop means for the piston-rod assembly 2; 3 and opens at the upper surface 17a as shown. On the other hand, the lower end 118c of said communication tube 118 protrudes from the chamber A laterally through the lower end of hollow rod part 3a and the upper end of piston 2 into the central passage bore 10 thereof. A still further difference resides in the provision of a mechanical suspension spring 25 which is held under precompression between a spring mount 26 attached fixedly at the top closed end of the hollow rod part 3a, and a lower spring mount 27 which is rigidly attached to the lower end of said cylinder 1. By reason of the said upper spring mount 26 acting as a part of the foregoing one shown at 19 in FIG. 1, the remaining part of the cover shown at 119 is made of a resilient material such as rubber in place of the rigid metal as was employed in the foregoing first embodiment. By the provision of this suspension spring 25, the allocated weight of vehicle chassis to the present suspension strut can be correspondingly reduced. The operation will be self-explanatory from the foregoing without further detailed analysis of the present embodiment. The bore of said communication tube 118 is shown in FIG. 3 at 118a.

Figure 4:
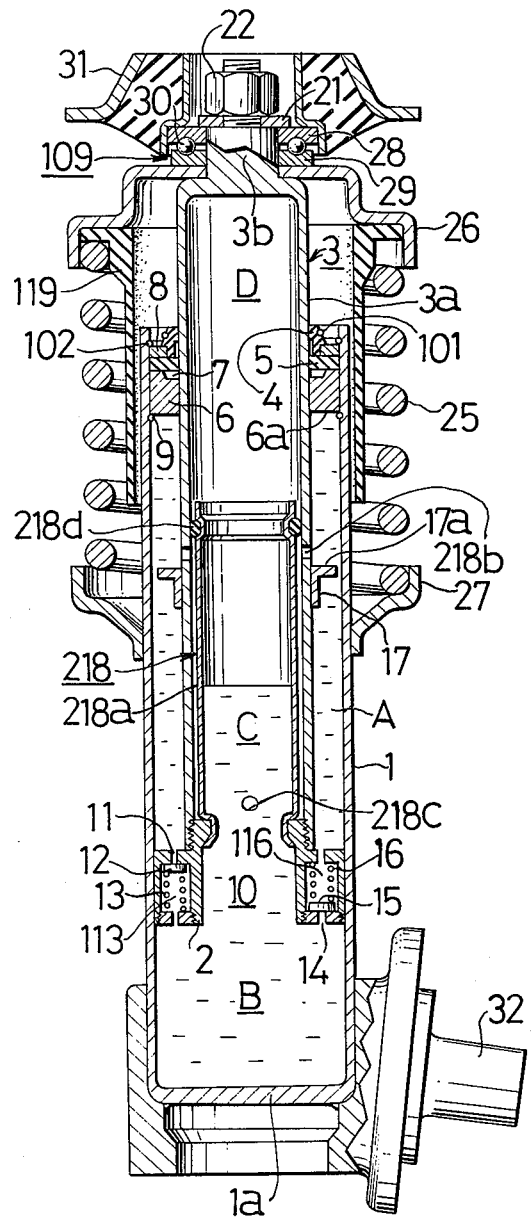

In a further modification shown in FIG. 4, the main difference from the foregoing resides substantially in the design and arrangement of the communication tube means.

In the present modification, a tubular member 218 is provided concentrically within the interior space of the hollow rod part 3a, a ring-shaped space 218a formed between the member 218 and the hollow rod part 3a and passage opening means 218b are provided at the upper end of the gap space 218a through the wall of the hollow rod part for establishing fluid communication between the chamber A and the uppermost end of the latter being closed by a sealing means 218d positioned between the parts 3a and 218. This sealing means 218d defines the uppermost extrimity of the gap space 218b and prevents the high pressure gas prevailing in the chamber D from invading into the gap space 218b. At least a passage opening 218c is formed through the lower part of the wall of said tubular means 218 for establishing fluid communication between said gap space 218a with the oil chamber C which is now formed at the lower part of said tubular member 218. The lowermost extremity of said gap space 218a is defined by the piston 2.

In the present embodiment, the lower spring mount 27 is positioned at an intermediate point between the both end extremities of the cylinder 1, and in place of the lower end thereof in the case of the first modification shown in FIG. 3, on account of shorter design of the suspension spring 25.

The upper spring mount 26 mounts a ball bearing unit 109 which comprises stationary lower race 29, a rotatable upper race and a plurality of bearing balls 30 rellably mounted therebetween.

By the provision of the ball bearing unit 109, a fitting means 31 for attaching the suspension strut shown in FIG. 4 to the vehicle chassis, not shown, can be rotatable relative to the strut for avoiding the latter from being applied an excessive turning force.

As shown, the lower end of the cylinder 1 is rigidly connected with a conventional axce- mounting member shown at 32. The upper half of the interior space of said tube member 218 constitutes a small gas space which is practically a part of the gas chamber D.

The liquid communication between the chambers A and C is carried out through lateral passage means 218b, gap space 218a and passage opening means 218c. The gap returning job is performed through these means.

The overall operation of the present strut is similar to that as described in connection with FIG. 3.

A still further modified embodiment is shown in FIG. 5.

In the present modification, a damping valve assembly comprising a check valve 312, a valve spring 313, and a limited flow passage 318c which are similar to those denoted in FIG. 1 by such numerals 12, 13 and 11 is provided at the lower end of communication tube 18 in place of the former position within the material of piston 2. Partially, other liquid-damping and gas return operations are similar to those described in connection with FIG. 1 so that no further analysis would be necessary for full understanding of the present modification.

It should be noted that any one feature of one embodiment can be utilized in any other embodiment, so far as no conflict is invited by such further design alteration.

The salient advantages with use of any of the foregoing embodiments are as follows:

1. By the employment of larger and hollow piston rod, the mechanism according to this invention represents a higher rigidity as a whole of the mechanism.
2. Since high pressure air or gas is sealed-in within the interior hollow space, the damping performance or characteristics are made highly stable.
3. By the employment of the single tube mode, the overall structure is rather economic in manufacture and it has an efficient heat-dissipating performance.
4. Leakage of the sealed-in gas from inside to outside of the mechanism can be positively prevented.
5. Provision of the valve means will assure to modify and adjust the W-S curve as desired and in a highly simplified manner.

A still further modification from the first embodiment shown in FIG. 1 is illustrated in FIG. 6. Substantial parts of this embodiment are similar to those and denoted with respective same reference numerals and symbols as before.

At a slightly higher level than that of the ring flange 17, there is provided a check valve unit 418 which is fixedly mounted in the wall of the hollow piston rod part 3a and directs laterally and inwardly. The check valve unit 418 is formed with a pair of fluid passage openings 419a and 419b aligned in line with each other and a valve chamber 419 kept in fluid communication therewith. The passage opening 419a is normally closed from inside by a valve disc 420 which is resiliently urged in its closing direction by a valve spring 422. Valve disc 420 and valve spring 422 is contained in the valve chamber 419. Valve disc 420 is fitted fixedly with a sealing ring 421 for assuring a tightly closed valve position relative to the inlet opening 419a. It will thus be seen from the foregoing that this check valve unit 418 allows only a unidirectional oil flow in the direction from the chamber A towards the interior space of the hollow piston rod 3a. In this modified embodiment, the communication tube 18, 118 or 218 showing in the foregoing embodiments have been dispensed with.

It will be seen from the foregoing that when the vibration damping mechanism is expanded under the influence of chassis vibration, the suddenly and substantially increased oil pressure in the chamber A will escape therefrom through now opened check valve unit 418 into the interior space of hollow rod 3a. During the flow through the reduced fluid passage, damping force will be generated at the unit 418 which acts thus as a damping force-generating means as before.

Upon arrival of the piston 2 at its uppermost, where the inlet opening 419a is brought into fluid communication with the upper part of the chamber A or even with the gas accumulating ring space 7, occasionally accumulated gas will be discharged through the unit 418 into the gas chamber D.

A still further modified embodiment shown in FIG. 7 is a combination of the first modification shown in FIG. 3 with the fourth modification shown in FIG. 6, wherein, however, the communication tube 118 has been replaced by a check unit 418. Therefore, the structure and operation of the present modification could be fully understood by reference to FIGS. 3 and 6 and their related disclosure.

A further modified embodiment is shown in FIG. 8. This is a combination of the second modification shown in FIG. 4 with the fourth modified embodiment, wherein, however, the communication tube 218 and its related several parts have been replaced by the check valve unit 418. Thus, the structure and operation of the present embodiment can be easily understood by reference to the foregoing and without further detailed analysis.

The embodiments of the invention in which an exclusive property or privilege is claimed are as follows:

1. A vibration damper mechanism comprising a cylinder having a predetermined quantity of hydraulic fluid sealed therein, an annular piston slidably mounted in the interior of said cylinder for dividing said cylinder into first and second variable volume chambers, a hollow piston rod having an open end secured to said annular piston and passing outwardly from said cylinder through said first chamber, stop means on said piston rod to limit outward movement of said piston rod from said cylinder, guide means for guiding said rod in sealed sliding engagement with an aperture in one end of said cylinder, the other end of said piston rod being closed to define a hydraulic fluid receiving chamber adjacent said open end and a gas chamber adjacent said other end, said hydraulic fluid receiving chamber in said hollow piston rod being disposed in permanent communication with said second chamber through the central opening in said annular piston to define a unified hydraulic fluid pressure chamber, a fluid flow limiting conduit means secured to said hollow piston rod and having an inlet end and an outlet end, said inlet end being disposed in communication with said first chamber adjacent said stop means between said stop means and said guide means and said outlet end being disposed in communication with the interior of said hollow piston rod, one way valve means for permitting restricted fluid flow from said unified chamber to said first chamber and one-way valve means secured to the outlet end of said conduit means to permit fluid passage from said first chamber to the interior of said hollow piston rod.

* * * * *